United States Patent [19]

Creter

[11] Patent Number: 5,393,169

[45] Date of Patent: * Feb. 28, 1995

[54] BREAKWATER

[75] Inventor: Richard E. Creter, 24 Timberwick Dr., Flemington, N.J. 08822

[73] Assignee: Richard E. Creter, Flemington, N.J.

[ * ] Notice: The portion of the term of this patent subsequent to Apr. 7, 2009 has been disclaimed.

[21] Appl. No.: 110,344

[22] Filed: Aug. 20, 1993

Related U.S. Application Data

[63] Continuation of Ser. No. 796,740, Nov. 25, 1991, abandoned, which is a continuation of Ser. No. 501,729, Mar. 30, 1990, Pat. No. 5,102,257.

[51] Int. Cl.$^6$ .................................................. E02B 3/04
[52] U.S. Cl. ........................................ 405/25; 405/30; 405/33
[58] Field of Search .................... 405/15, 21, 23, 25, 405/30, 33, 34, 22

[56] References Cited

U.S. PATENT DOCUMENTS

| | | |
|---|---|---|
| 805,142 | 11/1905 | Kellner . |
| 1,175,962 | 3/1916 | Latham . |
| 1,816,095 | 7/1931 | Stanford . |
| 1,847,043 | 2/1932 | Ball . |
| 2,069,715 | 2/1937 | Arpin .................................. 405/25 |
| 2,967,398 | 1/1961 | Smith . |
| 3,037,726 | 6/1962 | Phillips . |
| 3,126,176 | 3/1964 | Lynn . |
| 3,386,250 | 6/1968 | Katayama . |
| 3,415,061 | 12/1968 | Staempfli ............................. 405/34 |
| 3,653,216 | 4/1972 | Stickler . |
| 3,733,831 | 5/1973 | Stickler . |
| 3,797,787 | 3/1974 | Watanabe . |
| 3,845,630 | 11/1974 | Karnas ............................... 405/30 |
| 3,875,750 | 4/1975 | Campbell ................................. 61/4 |
| 3,913,333 | 10/1975 | Hubbard . |
| 4,367,978 | 1/1983 | Schaaf et al. ........................ 405/30 |
| 4,397,578 | 8/1983 | Inman .................................. 405/33 |
| 4,407,608 | 10/1983 | Hubbard ........................ 405/25 X |
| 4,436,447 | 3/1984 | Crowe ................................. 405/16 |
| 4,471,924 | 9/1984 | Lynn . |
| 4,498,805 | 2/1985 | Weir .................................. 405/31 |
| 4,502,816 | 3/1985 | Creter et al. ........................ 405/30 |
| 4,524,551 | 6/1985 | Scheiwiller ........................... 52/98 |
| 4,790,685 | 12/1988 | Scott et al. .......................... 405/30 |
| 4,818,141 | 4/1989 | Rauch ................................ 405/30 |
| 4,913,595 | 4/1990 | Creter et al. ........................ 405/30 |
| 5,102,257 | 4/1992 | Creter ................................ 405/25 |

FOREIGN PATENT DOCUMENTS

| | | |
|---|---|---|
| 178510 | 4/1986 | European Pat. Off. . |
| 745208 | 2/1933 | France . |
| 1019527 | 1/1953 | France ............................... 405/21 |
| 1373090 | 8/1961 | France . |
| 2367146 | 5/1978 | France . |
| 2446893 | 8/1980 | France . |
| 2598162 | 11/1987 | France . |
| 374550 | 4/1923 | Germany . |

OTHER PUBLICATIONS

Engineering Record, "Sea Walls Compared", vol. 73, No. 5, p. 140, Jan. 1, 1916.

Primary Examiner—Randolph A. Reese
Assistant Examiner—John A. Ricci
Attorney, Agent, or Firm—Kenyon & Kenyon

[57] ABSTRACT

A modular artificial reef effective to prevent shoreline erosion is constructed of reef-forming modules placed in side-by-side relation and coupled together to prevent relative movement therebetween. The modules, preferably having a triangular prismatic shape, include a gently sloping seaward face, a beachward face and a base which rests on the sea bottom. The modules are configured to deflect currents, approaching from the sea, away from the beachward face. This configuration prevents currents from flowing at high velocity along the beachward face and toward the beachward toe. Accordingly, scouring of the seabed adjacent to the beachward toe of the artificial reef is minimized or eliminated.

1 Claim, 2 Drawing Sheets

BREAKWATER

This is a continuation of application Ser. No. 07/796,740, filed Nov. 25, 1991, now abandoned, which is, in turn, a continuation of application Ser. No. 07/501,729, filed Mar. 30, 1990, now U.S. Pat. No. 5,102,257.

FIELD OF THE INVENTION

The present invention relates to breakwaters generally, and more particularly to submerged modular breakwaters.

BACKGROUND OF THE INVENTION

Modular breakwaters have been placed on sea bottoms in the vicinity of eroding shorelines to protect the shorelines from further erosion. However, it has been found that when such breakwaters are employed in areas where they are fully submerged, i.e., where the barrier or reef is placed in about seven to eight feet of water, concerns arise in assembling the breakwater and with toe scour adjacent the beachward face.

Specifically, due to reduced visibility at depths where the barrier would be submerged, which reduced visibility can result from sand suspended in the water, proper alignment of the modules can be difficult. When adjacent modules are improperly aligned, interlocking mechanisms therebetween can be rendered nonfunctional. Accordingly, a further attempt to properly align the modules can be necessary. Therefore, there is a need to provide an interlocking modular breakwater that can be readily aligned, while being submerged.

Further, when an artificial reef is completely submerged some of the wave energy directed at the seaward face can be redirected down the beachward face. This phenomenon creates beachward toe scour, which is not readily apparent from studying shoreline breakwaters where the breakwater is not completely submerged.

The beachward face of typical reef-forming modules is substantially sloped and smooth. It has been found that when these modules are fully submerged, current flows over the modules, and down the beachward face toward the beachward toe of the modules. The current flowing over and down the beachward face of the modules develops a relatively high velocity and causes severe scouring of the sand adjacent to the beachward toe. Such scouring, which could extend ten to twenty feet from the modules, increases the slope of the adjacent sea bottom. As the slope of the sea bottom is increased, the tendency for shoreline erosion increases.

The problem of stabilizing the sea bottom adjacent the beachward face is exacerbated in man-made beaches, i.e., where sand has been pumped in to build-up the beach. These replenished beaches have relatively steep slopes in the area where they meet the natural sea bottom and have a very high tendency toward erosion. In these instances, scouring of the sea bottom adjacent the beachward toe of a submerged reef tends to diminish the erosion protection advantages of the reef and eventually reduces the stability of the artificial reef structure.

Therefore, there is a need to provide a modular breakwater that minimizes or eliminates scouring of sand adjacent to its beachface toe when the breakwater is submerged.

SUMMARY OF THE INVENTION

The present invention is directed to a modular breakwater that avoids the problems and disadvantages of the prior art. The invention accomplishes this goal by providing a breakwater construction including a plurality of modules. Each module includes a base portion for supporting the module on a seabed, a gently sloping seaward face extending above the base portion, and a beachward face extending above the base portion. The beachward face includes a deflector for deflecting downwardly directed fluid currents away from the beachward face. This deflection advantageously prevents current from reaching and scouring the seabed adjacent to the beachward toe of the breakwater. Absent this deflection such scouring would take place and the beach would erode to fill in the scoured portion. The deflector also reduces the velocity of the downwardly directed fluid currents, thereby minimizing the scouring effect of current that reaches the seabed adjacent to the beachward toe of the breakwater.

The seaward face also includes a recessed portion that forms a transversely extending concave surface adjacent to the top edge for directing fluid currents over the top edge and away from the beachward face. Accordingly, the concave surface in the seaward face also prevents currents from reaching the seabed adjacent to the beachward toe of the breakwater. This concave surface further reduces the velocity of the wave passing over the breakwater, thereby minimizing the velocity of currents that may reach the seabed adjacent to the beachward toe of the breakwater to greatly reduce the degree of beachward toe scour.

When the modules are positioned in side-by-side relation, adjacent modules are coupled together by cooperating mortise and tenon members. The tenon members are L-shaped and extend from one side of a respective module. The mortises have an L-shaped configuration and are formed in the bottom surface of a respective base adjacent to a side of the base parallel to the one side. This arrangement permits the assembler to align and couple the reef-forming modules by feel. In this way, the modules can be readily assembled to form a submerged breakwater in low visibility water, while the assembler remains above the waterline.

Terms such as "seabed" and the like are used in this specification. These terms are chosen to aid disclosure, rather than limit the invention, and use of such terms is not intended to limit the use of the present invention to, e.g., ocean beaches, salt water beaches, etc. Such terms are used herein to generically describe all bodies of water having beaches or the like where the present invention can be used.

The above is a brief description of some deficiencies in the prior art and advantages of the present invention. Other features, advantages and embodiments of the invention will be apparent to those skilled in the art from the following description, accompanying drawings and appended claims.

DETAILED DESCRIPTION

Figure 1:
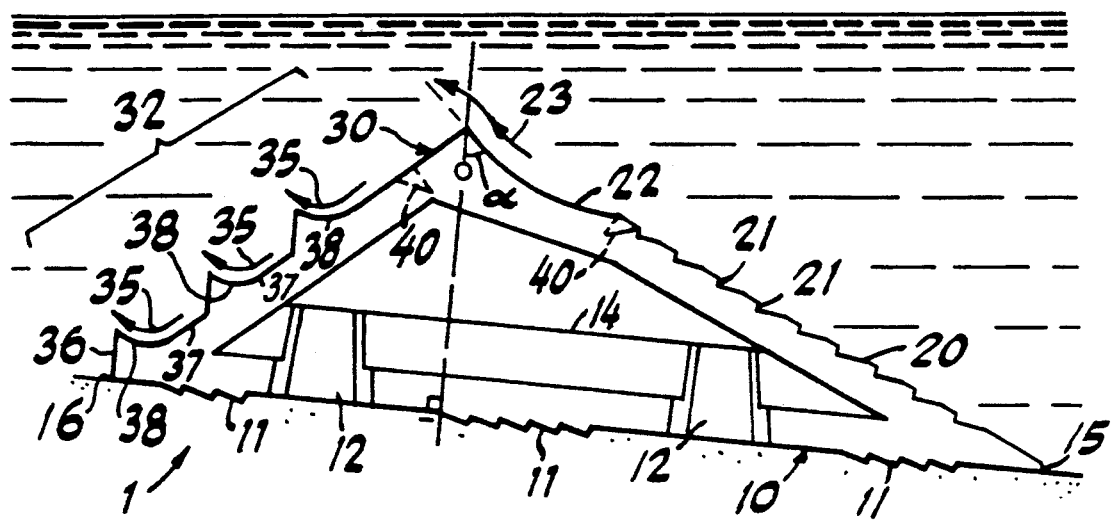
FIG. 1 is a side elevational view of the breakwater module in accordance with the principles of the present invention.

Referring to the drawings in detail, wherein like numerals indicate like elements, reef-forming module 1 is illustrated in accordance with the principles of the present invention. Reef-forming module 1, preferably having a generally triangular prismatic shape, includes base 10, seaward face 20 and beachward face 30.

Base 10, which is designed to rest on the sea bottom, is equipped with anchoring structures to anchor reef-forming module 1 on the seabed. These anchoring structures preferably are in the form of feet such as anchoring or gripping feet 11, which, as illustrated, mechanically depend from the bottom surface of base 10, have a saw tooth configuration and extend across the width of the module. Because objects positioned on the sea bottom have a tendency to be drawn to sea, anchoring or gripping members 11 are configured such that they point away from beachward face 30 or toward seaward face 20 of reef-forming module 1. For purposes of illustration, the seaward and beachward toes or edges of the modules are designated with reference numerals 15 and 16, respectively.

Construction of the artificial reef to the desired length can be carried out by laying down reef forming modules 1 in side-by-side relation. Adjacent reef-forming modules 1 are coupled through tenon members 12 and mortises 13. As shown in the drawings and, in particular FIG. 4, tenon members 12 are L-shaped and extend generally perpendicularly from one side surface of base 10. Mortises 13, shown in phantom, are formed in the bottom of base 10 adjacent the surface opposite the surface from which tenon members 12 extend. Accordingly, base 10 is thicker in the regions of mortises 13 as designated by reference line 14.

As evident from the drawings, mortises 13 also have an L-shaped configuration corresponding to the configuration of tenon members 12. However, mortises 13 are dimensioned such that they are slightly larger than tenon members 12 so that they will readily slide over the tenon members during assembly. It has been found that when the mortises are dimensioned to be 2 inches larger than the tenons in all directions, the desired effect results. The relative space between the mortise and tenon is exaggerated in FIG. 4 to emphasize this concept.

Preferably two tenon members 12 and two mortises 13 are used to optimize installation efficiencies and module stability. When only one mortise-tenon pair is used, relative movement between adjacent reef-forming modules 1 may occur and undesirably affect the contour of the artificial reef. On the other hand, when more than two tenon-mortise pairs are used, not only are manufacturing costs increased, but it becomes more difficult to align these tenon-mortise pairs when adjoining adjacent reef-forming modules 1.

The above reef-forming module coupling configuration has proven exceptionally effective when assembling the artificial reef in waters over 8 feet in depth and having low visibility. The above mortise-and-tenon configuration permits the assembler to feel the mortises over the tenon members. The tapered configuration of the tenons, as shown in the drawings, also facilitates assembly. Accordingly, the assembler can couple reef-forming modules without having the mortise-and-tenon joints in view. In this way, the modules can be readily assembled to form a submerged breakwater in low visibility water, while the assembler remains above the waterline.

However, when assembling the artificial reef in waters having very high visibility, the module coupling mechanism disclosed in U.S. Pat. No. 4,913,595, which is hereby incorporated herein, can be used.

Seaward face 20 of reef-forming module 1 is provided with wave force dissipation means as disclosed in U.S. Pat. Nos. 4,502,816 and 4,913,595. The wave dissipation means serve to dissipate wave energy as waves run up the seaward face without creating secondary reflective forms of wave energy. Such force dissipation means also serve to release silt or sand that has been suspended in the water such that the released silt or sand slides down the seaward face to replenish sand that has been removed adjacent to the seaward toe of the reef-forming module. A form of wave force dissipation means on the seaward face is illustrated in the drawings as a set of parallel, transverse groves 21 extending across the seaward face. A washboard configuration or a system of small surface protrusions or bumps are also useful. The above dissipation means has been found to provide a rate of solid deposition to the toe of the module that substantially exceeds any tendency to toe scour.

Reef-forming module 1 also is provided with deflectors arranged to deflect currents away from the beachward face such that high velocity currents do not develop along the surface of the beachward face and scour sand adjacent to the beachward toe.

Figure 2:
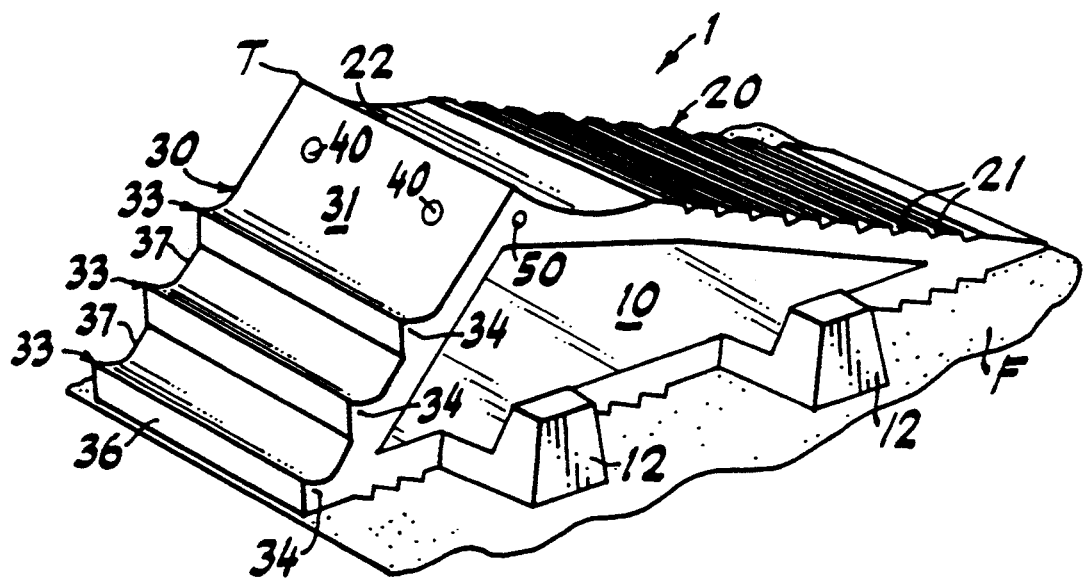
FIG. 2 is a perspective view of the module illustrated in FIG. 1.
Figure 3:
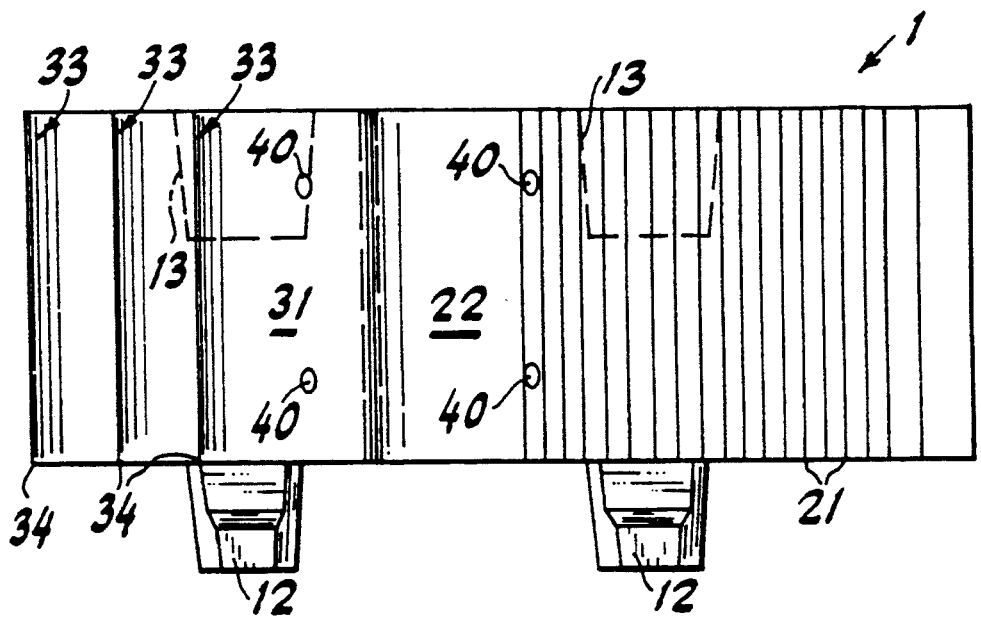
FIG. 3 is a top plan view of the module illustrated in FIG. 1.

Seaward face 20 is provided with deflector 22 which is formed at the upper portion of the seaward face at the juncture of the seaward and beachward faces. A concave recessed portion in seaward face 20 forms deflector 22. As can be seen in FIGS. 1 and 2, concave deflector 22 extends transversely along the entire width of seaward face 20 and has a substantially constant radius of curvature. Referring to FIG. 1, the slope of deflector 22 at its upper-most portion must be of a value such that current 23 is deflected over top edge T of reef-forming module 1 and away from the seabed adjacent to beachward face 30. To this end, the line tangent to the upper-most portion of deflector 22 adjacent to top edge T, forms an angle α with the vertical line that is normal to the bottom surface of base 10 of at least 30 degrees. In this way, deflector 22 deflects current away from beachward face 30 and the beachward toe.

Beachward face 30 is still subject to current flow. First, components of current 23 deflected by deflector 22 can return toward beachward face 30 generally at a region about mid-way down the beachward face. Further, currents not deflected by deflector 22 can reach beachward face 30. Accordingly, beachward face 30 also is provided with deflectors.

The upper portion of beachward face 30 is generally not subject to a relatively high degree of current relative to the lower portion of beachward face 30. Whatever currents that do reach the upper portion of beachward face 30 generally do not gain sufficient velocity to warrant concern. Accordingly, the upper portion of beachward face 30, designated with reference numeral 31, can be generally planar. However, the lower portion of beachward face 30 is provided with deflectors 33 to form a current deflecting portion 32.

Deflectors 33 can be formed by providing projections or raised portions 34 on beachward face 30. These projections extend transversely along beachward face 30. The upper surface of each projection 34 has a concave configuration, generally designated by reference numeral 38. Referring FIG. 1, it can be seen that downwardly directed current 35 is deflected by deflectors 33 away from beachward face 30 before the current can develop sufficient momentum to develop a velocity that would warrant concern. Further, it can be seen that deflectors 33 deflect the current far enough away from the beachward toe of reef-forming module 1 such that fluid activity at the beachward tow is greatly reduced and sand adjacent thereto is not scoured or removed.

Another feature that protects the beachward tow from currents running in the vicinity of the beachward face of reef-forming module 1 is beachward edge face 36 which is substantially perpendicular to the bottom surface of base 10. The orientation of edge face 36 further reduces the possibility of currents reaching the beachward tow of reef-forming module 1.

Figure 4:
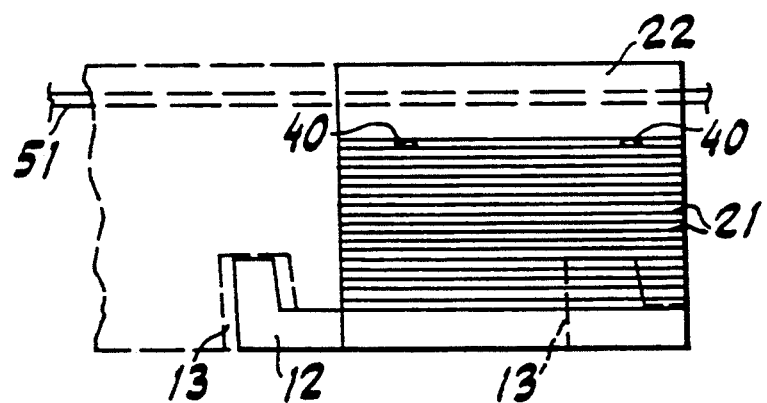
FIG. 4 is a front elevational view of the module illustrated in FIG. 1.

Reef-forming modules 1 are provided with frustoconical holes 40 which are configured to cooperate with a clamshell type lifting device. Two such holes are provided at the upper portion of the seaward face and two holes are provided in the beachward face. These holes preferably have at their surface a six inch diameter. It should be understood that other lifting methods can be used. For example, reef-forming module 1 can be provided with through holes in the same area as holes 40. Lifting straps or lifting cables can be inserted through the seaward hole and then through the beachward hole to lift or lower the reef-forming module. Referring to FIG. 4, each reef forming module is also provided with a bore that extends through the upper region of the module and through the entire width thereof. Such a bore is illustrated in phantom and designated by reference numeral 50. Thus, when the modules are coupled in side-by-side relation, thereby forming the artificial reef, post-tensioning cable 51 can be passed through cable bore 50 to tie the upper portions of the reef forming modules together. The outer modules can be connected by reinforced concrete beams or the like to assist in stabilizing the outer modules.

The modular structures are assembled on filter fabric which is designated in FIG. 2 with reference character F. This fabric is placed on the seabottom and underneath the reef forming modules. Filter fabric conventionally permits fluid passage therethrough, while not permitting the passage of particulate.

Obviously, the sizes and materials used to make up each reef-forming module may be selected from a wide variety of sizes and/or materials. Merely to exemplify a preferred makeup of these components which has been found to produce the desired effects the following example may be recited.

The modules are prepared using micro-silica concrete having a compressive strength of 8,000 psi. Long life for the reinforced concrete modules is thereby assured even in salt water.

Base member 10 is about 17 feet in length and each module is about 5 feet in height. The seaward face forms an angle of about 25 degrees with base 10, while the beachward face forms an angle of about 40 degrees with base 10. Tenon members 12 extend about 2 feet from the side surface of base 10 to cooperate with mortises 13 which have a maximum depth of about 2 feet. Deflector 22 has a radius of curvature of about 36 inches, while Deflectors 33 each have a radius of curvature of about 12 inches. Each module weighs about 12 tons.

The above is a detailed description of a particular embodiment of the invention. It is recognized that departures from the disclosed embodiment may be made within the scope of the invention and that obvious modifications will occur to a person skilled in the art. The full scope of the invention is set out in the claims that follow and their equivalents. Accordingly, the claims and specification should not be construed to unduly narrow the full scope of protection to which the invention is entitled.

What is claimed is:

1. A module for forming an artificial reef comprising:
   a base portion for supporting the module on a seabed, the base portion having a bottom surface;
   a substantially planar beachward face extending from the base portion at a first angle; and
   a substantially planar seaward face extending from the base portion at a second angle, and with ends of the seaward face and beachward face distal to the base portion being connected and forming a top edge, the seaward face including a transversely extending concave surface adjacent to the top edge for deflecting currents away from the beachward face and the seabed adjacent thereto, with the concave surface being configured such that a line tangent to the uppermost portion of the concave surface, adjacent to the top edge, forms an angle with the vertical of at least 30 degrees.

* * * * *